US00H002066H

(19) United States

(12) Statutory Invention Registration (10) Reg. No.: US H2066 H

Cukauskas et al. (43) Published: Jun. 3, 2003

(54) SUPERCONDUCTOR AND NOBLE METAL COMPOSITE FILMS

(75) Inventors: Edward J. Cukauskas, Vienna, VA (US); Laura H. Allen, Bowie, MD (US); Michael A. Fisher, White Plains, NY (US)

(73) Assignee: The United States of America as represented by the Secretary of the Navy, Washington, DC (US)

(21) Appl. No.: 08/692,321

(22) Filed: Aug. 5, 1996

Related U.S. Application Data

(63) Continuation of application No. 08/451,847, filed on May 26, 1995, now abandoned.

(51) Int. Cl.[7] ..... B32B 19/00

(52) U.S. Cl. ..... 428/688; 428/141; 428/901; 505/190

(58) Field of Search ..... 428/141, 209, 428/210, 688, 689, 701, 702, 901, 930; 505/190, 220, 230, 236, 237, 238, 239, 701, 702, 703, 704, 739, 874

(56) References Cited

U.S. PATENT DOCUMENTS

| | | | | | |
|---|---|---|---|---|---|
| 4,802,951 | A | * | 2/1989 | Clark et al. | 156/630 |
| 4,826,808 | A | * | 5/1989 | Yurek | 428/930 |
| 5,109,164 | A | * | 4/1992 | Matsui | 505/874 |
| 5,232,908 | A | * | 8/1993 | Shiga et al. | 505/739 |
| 5,276,012 | A | * | 1/1994 | Ushida et al. | 505/730 |
| 5,284,822 | A | * | 2/1994 | Sakai et al. | 428/930 |
| 5,399,547 | A | * | 3/1995 | Negm | 505/704 |
| 5,430,010 | A | * | 7/1995 | Murakami | 505/450 |

OTHER PUBLICATIONS

CRC, 64th Ed, (Melting Points & Boiling Points . . . ) 1 page.*

Hoshino, Jap Journ. of App Phys. vol. 27, No. 7, Jul. 1988 pp. L1297–L1299.*

Doss, Engineer's Guide to High $T_c$ Superconductivity, 1989 p 119.*

Sahu et al, in Chemistry of High–Temp Superconductors II, ACS (1988) Nelson, ed Chapter 1, pp 1–15.*

Hohenwater et al., Characteristics of Superconducting flux–flow transistors, IEEE Trans. Magn., vol. 27, pp. 3297–3300 3/91.

Kadin, Duality and fluxonics in superconducting devices, J. Appl. Phys., vol. 68(11), pp. 5741–5749 (Dec. 1, 1990).

Martens et al., S–parameter measurements on single superconducting thin–film three–terminal devices made of high Tc and low Tc materials, J. Appl. Phys., vol. 65 (10), pp. 4057–4060 (May 15, 1989).

Martens et al., Flux flow micorelectronics, IEEE Trans. Appl. Super., vol. 3(1) pp. 2295–2302 (Mar. 1993).

Rose–Innes et al., Introduction to Superconductivity, 2nd Edition, International Series in Solid State Physics, vol. 6, Pergamon Press, New York, pp. 186–190 (1978).

(List continued on next page.)

*Primary Examiner*—Michael J. Carone

*Assistant Examiner*—M. Thomson

(74) *Attorney, Agent, or Firm*—John J. Karasek; Stephen T. Hunnius

(57) ABSTRACT

Films having islands of noble metal protruding from and surrounded by a layer of a superconductor are formed by depositing a layer a noble metal on a substrate, and depositing a superconducting layer at a temperature that converts the noble metal film into puddles. The resulting film is useful as a two-dimensional array of superconductor-normal metal-superconductor Josephson junctions.

16 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

L.H. Allen et al., Thin Film composites of Au and $YBa_2CU_2O_{7-\delta}$, Appl. Phys. Lett., vol. 66(8), pp. 1003–1005 (Feb. 20, 1995).

Miyahara et al., Vortex flow Characterics of High–Tc Flux Flow Transitors, J. Appl. Phys., vol. 75(1), pp. 404–407 (Jan. 1, 1994).

E.J. Cukauskas et al., Role of Hydrogen in the growth of $Y_1$ $Ba_2Cu_3O_7$ on MqO substrates by off–axis magnetron sputtering, Appl., Phys. Lett., vol. 61(9), pp. 1125–1127 (Aug. 31, 1992).

L.H. Allen et al., Thin Film Composties of Au and $YBa_2Cu_3O_{7-\delta}$, IEEE Transactions on Applied Superconductivity, vol. 5, No. 2, pp. 1218–1221 (Jun. 2, 1995).

Y.H. Kao et al., Effects of silver doping in the high–Tc superconductor system Y–Ba–Cu–O, J. Appl. Phys., vol. 67(1), pp. 353–361 (Jan. 1, 1990).

Raissi et al., Josephson, fluxonic diode, Appl. Phys. Lett., vol. 65 (4), pp 1–3 (Oct. 3, 1994).

Bulletin of the American Physical Society, Program of the 1994 March Meeting, Mar. 1994, vol. 39, No. 1, Meeting from Mar. 20–Mar. 25, 1995, pp. 62, abstract by Fisher et al., Using the Ambegaokar–Halperin Model to Explain the Current Voltage Curves of Arrays of YBaCuO and Ag functions.

Copy of Viewgraphs shown at the Mar. 1994 APS Meeting referenced above. Nothing handed out at APS Meeting other than the abstract.

Fisher et al., $YBa_2Cu_3O_7$/Noble Metal Composite–thin Films for Applications in Fluxonic and Flux–Flow Devices, HTSED Workshop '94, May 26–28, 1994 in Whistler, British Columbia, Canada, Extended Abstract, pp 164–165, (1994).

* cited by examiner- $J_c$ for composites with 800 Å of YBCO and various thicknesses of Ag. $J_c$ is greatly reduced with increasing Ag thickness.

I-V traces for composite with 840 Å Ag, 800 Å YBCO. Small, applied fields cause significant reduction in $J_c$ and increase in sample voltage at a given current.

Resistive $T_c$'s for Au/YBCO composites. The onset remains high, but tails get longer as Au layer thickness is increased.

The voltage variation of a YBCO/Au composite bridge due to a 3 Gauss applied field at selected temperatures.

The photoresponse and resistive transition of a YBCO/Au composite thin film bridge. The bridge bias current is indicated.

SUPERCONDUCTOR AND NOBLE METAL COMPOSITE FILMS

The present application is a continuation application of U.S. Ser. No. 08/451,847, filed May 26, 1995, now abandoned.

BACKGROUND OF THE INVENTION

Field of the Invention

The present invention relates to a composite material film (and/or thin film) and a method of preparation wherein the composite material has a low critical current density and a high critical temperature. The invention particularly relates to a composite of a superconductor such as $YBa_2Cu_3O_7$-δ (YBCO) or $Bi_2Sr_2Ca_2Cu_3O_x$ or $Bi_2Sr_2Ca_1Cu_2O_x$ (BSCCO) and one or more noble metals such as gold and/or silver upon a substrate, each material deposited at a desired thickness upon a substrate wherein magnetic vortices in the. superconductor are easily moved.

DESCRIPTION OF THE RELATED ART

There is considerable interest in superconducting flux flow and fluxonic devices. See Hohenwater et al., *Characteristics of superconducting flux-flow transistors,* IEEE Trans. Magn., vol. 27, pp. 3297-*3300* (Mar. 1991), incorporated herein by reference in its entirety and for all purposes. See also Kadin, Duality and fluxonics in superconducting devices, J. Appl. Phys., vol. 68, pp. 5741-5749 (Dec. 1990), incorporated herein by reference in its entirety and for all purposes. These devices are based on the motion of either Abrikosov or Josephson vortices and require a material whose material properties do not impede the flow of magnetic flux. The high pinning strengths of $YBa_2Cu_3O_{7-\epsilon}$ (YBCO) have made it unsuitable for flux flow devices without modifying the YBCO in some manner such as thinning or taking advantage of naturally occurring defects such as the grain boundary junction formed over a substrate step. See Martens et al., Sparameter measurements on single superconducting thin-film three-terminal devices made of high $T_c$ and low $T_c$ materials, J. Appl. Phys., vol. 65, pp. 4057–4060 (May 1989), incorporated herein by reference in its entirety and for all purposes. See also Martens et al., Flux flow microelectronics, IEEE Trans. Appl. Super., vol. 3, pp. 2295-2302 (Mar. 1993), incorporated herein by reference in its entirety and for all purposes.

Researchers have sought practical, three terminal, superconducting devices for applications in hybrid technologies and on-chip integration with passive, superconducting components. Such devices included the flux-flow transistor and the fluxonic junction transistor, both of which require a superconducting material in which vortices can easily move.

High quality high temperature superconductor (HTS) thin films having "easily movable vortices" are difficult to fabricate. High quality thin films of YBCO generally have $T_c$'s approaching 90 K. (degrees Kelvin) and $J_c$'s at 77 K. greater than $1\times10^6$ A/cm$^2$ and show strong vortex pinning. In such materials, vortex motion is difficult except very close to $T_c$ or in very high magnetic fields (10's of Tesla). See Rose-Innes et al., *Introduction to Superconductivity,* 2nd Edition, International Series in Solid State Physics, Vol. 6, Pergamon Press, New York, at pp. 186–190 (1978), incorporated herein by reference in its entirety and for all purposes.

Materials having low vortex pinning (easy vortex motion) usually have a reduced $T_c$ and $J_c$ and are chemically unstable in the ambient environment. This is because the material within or at the grain boundaries often consists of impurities or off-stoichiometric material causing a reduced $T_c$, $J_c$ and chemical stability, respectively. For example, oxygen-deficient YBCO films which have reduced $T_c$'s and $J_c$'s as well as weak pinning have been shown to be very susceptible to damage from device processing and exposure to water-based chemicals. See L. H. Allen et al., Tin film composites of Au and $YBa_2Cu_2O_{7-\delta}$, Appl. Phys. Lett., vol. 66(8), pp. 1003–1005 (Feb. 20, 1995), incorporated herein by reference in its entirety and for all purposes. Once these materials are fabricated into vortex flow devices, they degrade and change their operating characteristics with age.

Even materials that were initially high quality are susceptible to processing damage. For example, weak-link microbridges fabricated from high-quality materials have exhibited "enhanced" vortex motion. However, when made and used in flux flow devices, they are often operated at reduced temperatures because the T, of the microbridge is degraded by the patterning process. See Miyahara et al., *Vortex Flow Characteristics of High-$T_c$ Flux Flow Transistors, J. Appl. Phys.,* vol 75, pp. 404 (1994), incorporated herein by reference in its entirety and for all purposes. Furthermore, the stability with time of these devices is uncertain because of the inherent chemical instability associated with degraded superconducting material.

SUMMARY OF THE INVENTION

It is therefore an object of the present invention to provide a composite material that consists of a random array of Josephson junctions in which Josephson vortices can easily move throughout the composite material film.

It is therefore another object of the present invention to provide a composite material that consists of a random array of Josephson junctions in which Josephson vortices can easily move throughout the composite material film and the composite material will exhibit variably controlled $J_c$ without a marked decrease in the T, of the superconductor and be chemically stable.

It is therefore another object of the present invention to provide a composite material that consists of a random array of Josephson junctions in which Josephson vortices can easily move throughout the composite material wherein the material "as-grown" will have the desired property of easy flux motion and avoid extra steps for device processing.

It is therefore another object of the present invention to provide a process for making a composite material that consists of a random array of Josephson junctions in which Josephson vortices can easily move throughout the composite material.

It is therefore another object of the present invention to provide a composite material that consists of a random array of Josephson junctions in which Josephson vortices can easily move throughout the composite material (e.g. film) wherein the composite material can be incorporated into a fluxonic junction diode.

It is therefore another object of the present invention to provide a composite material that consists of a random array of Josephson junctions in which Josephson vortices can easily move throughout the composite material (e.g. film) wherein the composite material can be incorporated into a fluxonic junction transistor.

It is therefore another object of the present invention to provide a composite material that consists of a random array of Josephson junctions in which Josephson vortices can easily move throughout the composite material (e.g. film) wherein the composite material can be incorporated into a flux-flow transistor.

It is therefore another object of the present invention to provide a composite material that consists of a random array of Josephson junctions in which Josephson vortices can easily move throughout the composite material (e.g. film) wherein the composite material can be incorporated into a bolometric device.

These and other objects are accomplished by making a composite material according to the process (I) of:

(a) providing a substrate;

(b) forming a noble metal layer having a first thickness upon said substrate; and (c) depositing a superconductor layer having a second thickness at a temperature wherein said metal layer forms puddles exposing regions of substrate and said superconductor deposits between said puddles on said exposed regions of said substrate.

Alternatively, these and other objects may also be accomplished by making a composite material according to the process (II) of:

(a) providing a substrate;

(b) forming a noble metal layer having a first thickness upon said substrate;

(c) heating said noble metal layer to a sufficient temperature to form puddles of noble metal exposing underlying regions of substrate; and (d) depositing a superconductor layer having a second thickness on said exposed regions of said substrate.

The composite material formed by the above process comprises:

(a) a substrate layer having puddles of noble metal deposited on said substrate wherein said puddles of said noble metal layer have a first thickness; and (b) said substrate layer having a superconductor layer deposited on said substrate between said puddles deposited on said substrate wherein said superconductor layer has a second thickness.

BRIEF DESCRIPTION OF THE DRAWINGS

A more complete appreciation of the present invention and several of the accompanying advantages thereof will be readily obtained by reference to the following detailed description when considered in conjunction with the accompanying drawings, wherein:

FIG. 3(*b*) depicts a cross-sectional schematic of substrate 10 coated with puddles of noble metal 20, the puddles 20 having a first thickness. The puddles of FIG. 3(*b*) being formed from the layer of the noble metal depicted in FIG. 3(*a*). The formation of a layer of noble metal 20 upon substrate 10 is accomplished according to step (b) of the presently claimed process (I). (See Summary of the Invention, supra).

FIG. 3(*c*) depicts a cross sectional schematic of substrate 10 with puddles of noble metal 20, and regions of a superconductor 30 deposited on regions of substrate 10 not occupied by puddles of noble metal 20. The exemplary superconductor YBCO refers to regions 30. The deposition of a superconductor is accomplished according to step (c) of the presently claimed process (I). (See Summary of the Invention, supra).

DESCRIPTION OF THE PREFERRED EMBODIMENTS

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

Figure 3A:
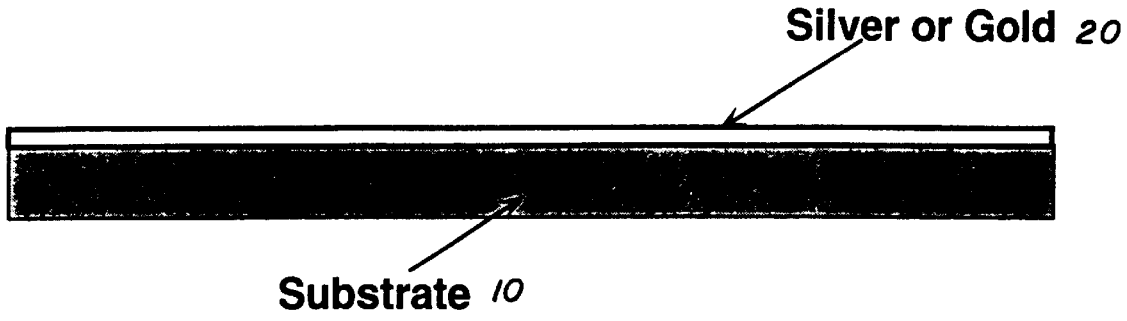
FIG. 3(*a*) depicts a cross-sectional schematic of substrate 10 coated with a layer of a noble metal 20 (e.g. silver; gold or mixtures thereof). The formation of a layer of noble metal 20 upon substrate 10 is accomplished according to step (b) of the presently claimed process (I). (See Summary of the Invention, supra).
Figure 3B:
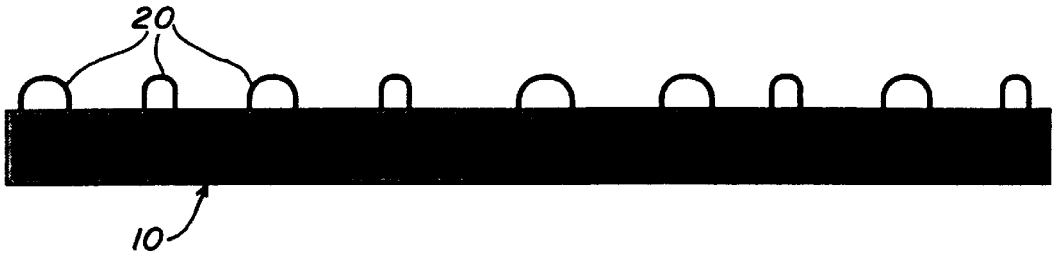
Figure 3C:
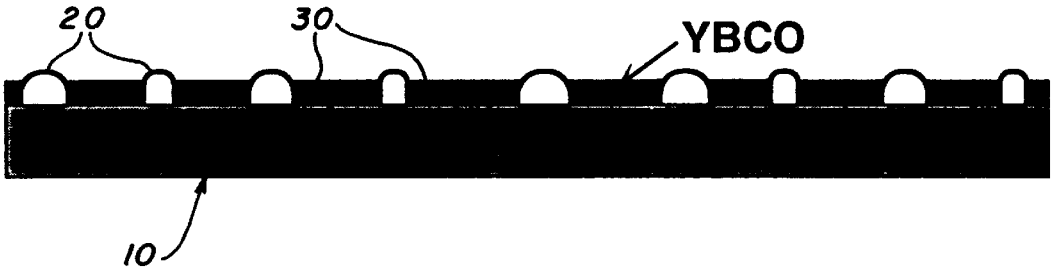

Please note that throughout this patent application a reference to the thickness of the noble metal puddles means the thickness of the noble metal layer when the noble metal layer is a continuous layer as exemplarily depicted in FIG. 3(*a*). The thickness of the puddles refers to the thickness of the noble metal layer prior to the noble metal coalescing into puddles or islands of noble metal as exemplarily depicted in FIGS. 3(*b*) and 3(*c*), respectively. Thus, the thickness of the noble metal is as indicated by the angstroms of thickness assigned to the noble metal layer as stated herein (infra and supra). Typically, the thickness of the noble metal after the noble metal forms puddles (i.e. thickness of puddles as in FIGS. 3(*b*) and 3(*c*)), has an average thickness near the thickness of the contiguous (unpuddled) noble metal layer (i.e. thickness of noble metal as in FIG. 3(*a*)).

With respect to superconducting materials, the $T_c$ is the critical temperature of a material below which temperature the superconducting material exhibits no measurable resistance to current flow. In addition, a superconducting material also has a $J_c$ which is the critical current density. If a current is passed through a sample of superconducting material and if the current is above $I_c$, the critical current, then the superconducting sample exhibits a measurable resistance. The value of J*c* is proportional to the value of I*c* ($J_c$=$I_c$/cross-sectional area of current flow). The lower the value of J*c*, the lower the value of $I_c$ and, therefore, the lower the threshold current that is required to move (i.e. unpin) vortices.

The purpose of this invention is the fabrication of thin film high temperature superconductors (HTS) with the important material property of "easily moved" magnetic vortices. This property can usually be associated with material having a low critical current density resulting from reduced intergranular coupling. Exemplary composite material films of exemplary YBCO and a noble metal such as Ag or Au (or mixtures thereof) exhibit this property. The superconducting onset temperature is not significantly reduced in these composite material films, suggesting that the exemplary YBCO grains are of high quality and that the gold or silver form a clean interface with the exemplary YBCO. The noble metal in these composites segregates from the YBCO and moves into the grain boundaries, producing a two dimensional array of Josephson junctions (i.e. superconductor region—normal metal region—superconductor region: see FIGS. 1, 2, 3(*c*)). The Josephson junction is an SNS or SIS junction wherein S is a superconductor, N is a normal metal and I is an insulator. These composite material films are candidate materials for fabricating three terminal HTS devices which rely on vortex interactions for the control of electron transport. These composite material films also have potential applications in non-linear superconducting devices, bolometers, and non-bolometric photodetectors.

The composite material film (or thin film) of a superconductor and one or more noble metals (e.g. Ag, Au or mixtures thereof) described herein are fabricated by the deposition of the superconductor onto a thin film of the noble metal(s). Noble metal exemplary thicknesses up to about 5000 Å were used in the development of these composite materials. If the noble metal is Ag, a thickness (of the noble metal layer puddles; see FIGS. 3(*a–c*), infra)) of up to about 5 times the thickness of the superconductor may be used. If the noble metal is Ag, a thickness (of the noble metal layer puddles; see FIGS. 3(*a–c*), infra) of down to about 1/10 the thickness of the superconductor may be used. The thickness of the superconductor layer can exemplarily be varied from about 500 to 5000 Å. Typically, for the exemplary Ag metal, the thickness of the puddles is between about 200 to about 4,500 Å. More typically, for the exemplary Ag metal, the thickness of the puddles is between about 300 to about 4000 Å. Most typically, for the exemplary Ag metal, the thickness of the puddles is between about 400 to about 3500 Å. Preferably, for the exemplary Ag metal, the thickness of the puddles is between about 500 to about 3000 Å. More preferably, for the exemplary Ag metal, the thickness of the puddles is between about 600 to about 2,500 Å. Most preferably, for the exemplary Ag metal, the thickness of the puddles is between about 800 to about 2000 Å. If the noble metal is Au, a thickness (of the noble metal layer puddles; see FIGS. 3(*a–c*), infra)) of up to about 1 times the thickness of the superconductor may be used. If the noble metal is Au, a thickness (of the noble metal layer puddles; see FIGS. 3(*a–c*), infra) of down to about 1/10 the thickness of the superconductor may be used. Typically, for the exemplary Au metal, the thickness of the puddles is between about 200 to about 2000 Å. More typically, for the exemplary Au metal, the thickness of the puddles is between about 250 to about 1750 Å. Most typically, for the exemplary Au metal, the thickness of the puddles is between about 300 to about 1500 Å. Preferably, for the exemplary Au metal, the thickness of the puddles is between about 350 to about 1000 Å. More preferably, for the exemplary Au metal, the thickness of the puddles is between about 375 to about 750 Å. Most preferably, for the exemplary Au metal, the thickness of the puddles is between about 400 to about 600 Å.

The noble metal is deposited onto a substrate at, for example, room temperature by any method onto a substrate which is compatible with the superconductor also to be deposited onto the substrate. The exemplary noble metals may be Ag or Au or mixtures thereof. The exemplary purity of the noble metals used was about 99.9%; however, any purity sufficient to produce composites with high $T_c$'s and low $J_c$'s and sufficient chemical stability may be used. Exemplary methods for depositing noble metal(s) onto the substrate include sputtering, evaporation, laser ablation, chemical vapor deposition. Sputtering may be conventional or off-axis sputtering or inverted cylindrical magnetron (ICM) sputtering (e.g. for YBCO deposition). Evaporation may be thermal evaporation or electron beam evaporation. Chemical vapor deposition may be metal organic chemical vapor deposition (MOCVD). Also, the noble metal(s) and superconductor may be deposited by any deposition process upon the substrate which does not require a post deposition anneal to temperatures above the melting point of the noble metal. Other methods of depositing the noble metal(s) (i.e. one or more noble metals) are well known in the art. Deposition of the noble metal is typically carried out at ambient temperatures or chemical vapor deposition temperatures wherein the substrate is stable at the noble metal deposition temperatures.

After deposition of a thin film of one or more noble metals upon a substrate, a superconducting material is deposited onto the noble metal layer at a temperature sufficient to coalesce the contiguous noble metal layer (depicted as 20 in FIG. 3(*a*)) into puddles (depicted as 20 in FIGS. 3(*b*) and 3(*c*), respectively) exposing the underlying substrate (depicted as 10 in FIG. 3(*b*)) and causing the deposition of a superconductor onto the exposed regions of the substrate 10 between the noble metal layer puddles 20 (see FIG. 3(*b*)) to form a composite as depicted in FIG. 3(*c*). Note that there are no regions of the upper substrate surface that remain exposed after deposition of both the noble metal and superconductor. Typical superconductors include YBCO and BSCCO, among others. Any of the yttrium based superconductors, bismuth based superconductors and thallium based superconductors may be used in conjunction with the present invention. Additionally, any high temperature superconductor compatible with Ag or Ag may be used in place of exemplary YBCO.

For the deposition of a superconductor onto a substrate with an Ag noble metal layer, the deposition is generally carried out at a temperature range, typically, between about 600 to about 800° C. more typically, between about 625 to about 775° C., most typically, between about 650 to about 770° C., preferably, between about 655 to about 765° C., more preferably, between about 660 to about 760° C., and most preferably, between about 670 to about 750° C. However, the temperature range for the deposition of the superconductor may be any temperature suitable or sufficient for the growth of the superconductor onto the surface of the substrate and sufficiently high to cause the metal layer to form puddles without being so high as to destroy the composite film of substrate, superconductor and noble metal.

For the deposition of a superconductor onto a substrate with an Au noble metal layer, the deposition is generally carried out at a temperature range, typically, between about 725 to about 850° C., more typically, between about 750 to about 825° C., most typically, between about 775 to about 815° C., preferably, between about 785 to about 805° C., more preferably, between about 790 to about 803° C., and most preferably, between about 795 to about 800° C. However, the temperature range for the deposition of the superconductor may be any temperature suitable or sufficient for the growth of the superconductor onto the surface of the substrate and sufficiently high to cause the metal layer to form puddles without being so high as to destroy the composite film of substrate, superconductor, and noble metal.

Methods for the deposition of the superconductor include sputtering, evaporation, laser ablation, chemical vapor deposition. Sputtering may be conventional or off-axis sputtering or inverted cylindrical magnetron (ICM) sputtering. Evaporation may be thermal evaporation or electron beam evaporation. Chemical vapor deposition may be metal organic chemical vapor deposition (MOCVD). Other methods of depositing the superconductor are well known in the art. Any in situ deposition technique is acceptable for the fabrication of the superconductor component of these composite material films. Deposition of the superconductor is carried out at temperatures noted above or at chemical vapor deposition temperatures wherein the substrate, the noble metal and the superconductor is stable (e.g. chemically stable, thermally stable etc.) at superconductor deposition temperatures.

A variety of substrates may be used in conjunction with the present invention. Exemplary substrates include MgO, $SrTiO_3$ (STO), $LaAlO_3$ (LAO) and yttria stabilized zirconia (YSZ). However, any substrate that is compatible with growth of a superconductors such as YBCO, BSCCO, yttrium based superconductor, bismuth based superconductor, and thallium based superconductor, respectively, and is compatible with Au and/or Ag deposition may be used.

Figure 1:
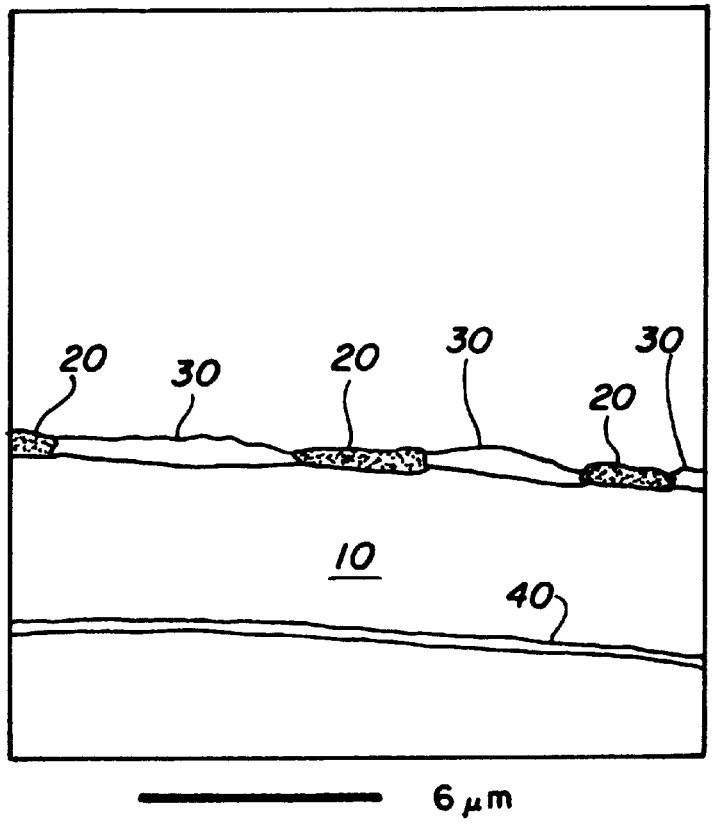
FIG. 1 is a schematic of a cross-sectional view of an exemplary composite material made according to the present invention wherein silver paste (silver paste not shown) is used to hold substrate 10 on the substrate holder (holder not shown) and the noble metal puddles of exemplary silver 20 and exemplary superconductor YBCO 30 are deposited on substrate 10. The exemplary silver regions denoted as 20 have an exemplary first thickness of about 3250 Å and exemplary YBCO regions denoted as 30 have an exemplary second thickness of about 800 Å. Also, MgO is the exemplary substrate region denoted as 10. Note the scale of 6 microns associated with FIG. 1. The exemplary composite material of FIG. 1 is made according to Example 3 and referred to as OA493, infra. The area denoted as 40 is merely a reflection of an edge of the substrate 10.
Figure 2:
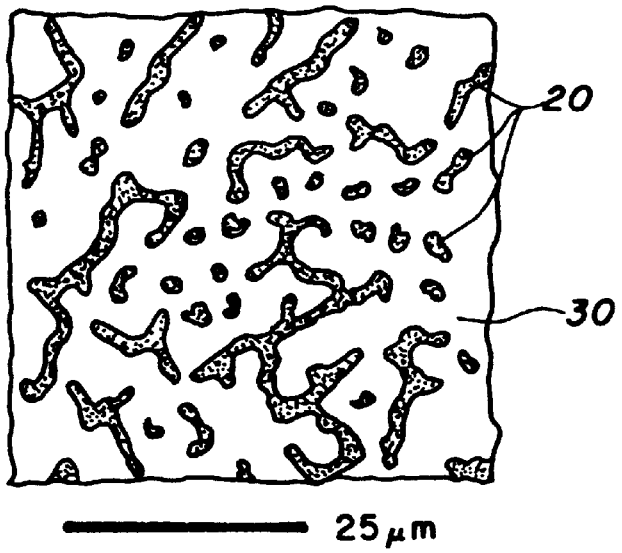
FIG. 2 is a schematic top view of another exemplary composite material made according to the present invention. Regions marked as 20 represent a noble metal (e.g. silver is the exemplary metal used in FIG. 2) and regions marked as 30 represent a superconductor (e.g. YBCO is the exemplary superconductor used in FIG. 2). The exemplary silver regions denoted as 20 have an exemplary first thickness of about 2000 Åand exemplary YBCO regions denoted as 30 have an exemplary second thickness of about 850 Å. Though not shown, the exemplary substrate 10 is MgO. Note the scale of 25 microns associated with FIG. 2. The exemplary composite material of FIG. 2 is made according to Example 1 and referred to as OA449, infra.

Gold and silver are not very reactive metals. Therefore, these noble metals (e.g. Ag and/or Au) do not adhere very well to many substrates. The increased surface mobility at high temperatures (e.g. temperatures at which superconductors such as YBCO are grown) allows these metals to coalesce into small puddles on the substrate and form a discontinuous film. This migration of the noble metal together with the deposition of the superconductor (e.g. YBCO) results in a composite material film of superconductor/noble metal (e.g. YBCO/Ag or YBCO/Au). The morphology of the composite material film (e.g. YBCO/Au) is such that the noble metal forms islands (i.e. puddles) surrounded by a superconductor (e.g. YBCO) or vice versa (i.e. YBCO islands or puddles surrounded by noble metal) depending upon the thickness of the noble metal and/or the thickness of the superconductor, the substrate used, and deposition conditions. Additionally, the noble metal also forms along the superconductor grain boundaries (e.g. YBCO grain boundaries) creating arrays of SNS Josephson junctions. FIGS. 1 and 2 illustrate the morphology of an exemplary YBCO/Ag composite material film fabricated from 850 Å of YBCO onto 2000 Å of silver upon an exemplary MgO substrate. The exemplary silver forms islands (i.e. puddles 20) on the exemplary MgO substrate 10 surrounded by a background of exemplary well-connected YBCO grains 30.

Figure 4:
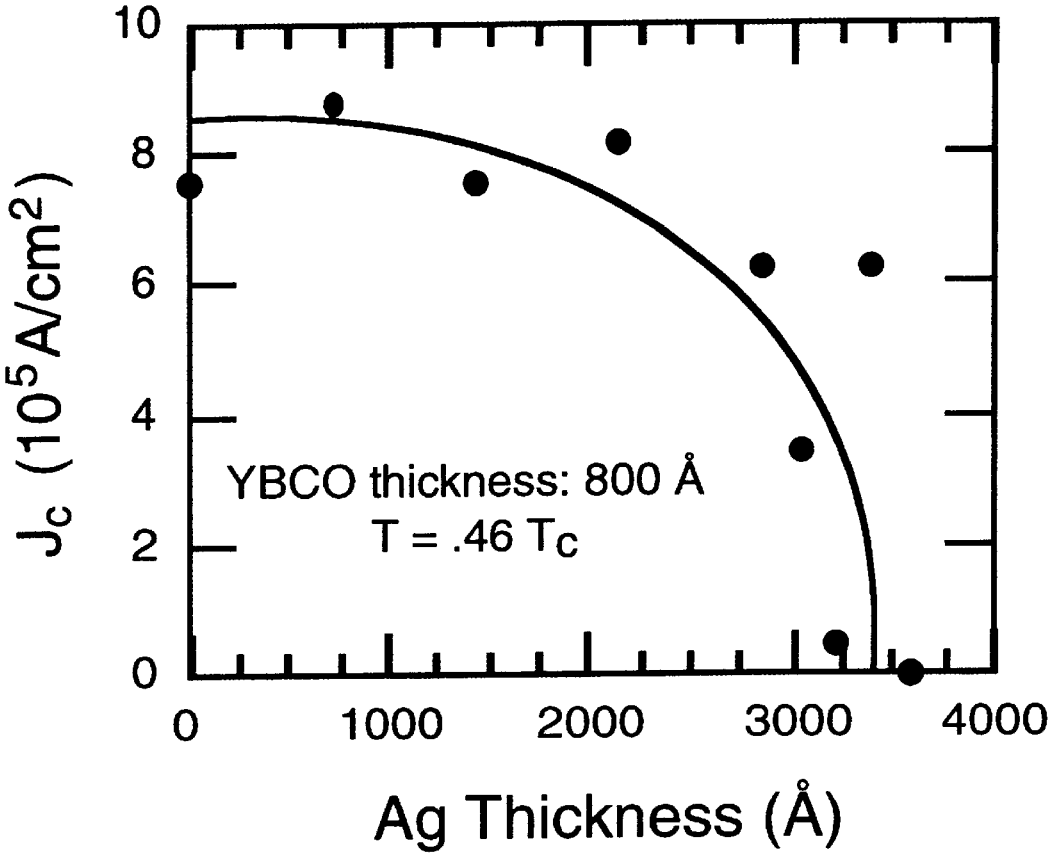
FIG. 4 is a plot of $J_c$, the critical current density (expressed in Amps/cm$^2$ units) versus the thickness (the thickness measured prior to forming the puddles i.e. the thickness of the noble metal layer as depicted in FIG. 3(*a*)) of exemplary silver puddles (expressed in Åunits) of an exemplary composite material of about 800 Å of YBCO and various thickness of exemplary Ag. Note that $J_c$ is reduced with increasing Ag thickness. The substrate is MgQ.
Figure 5:
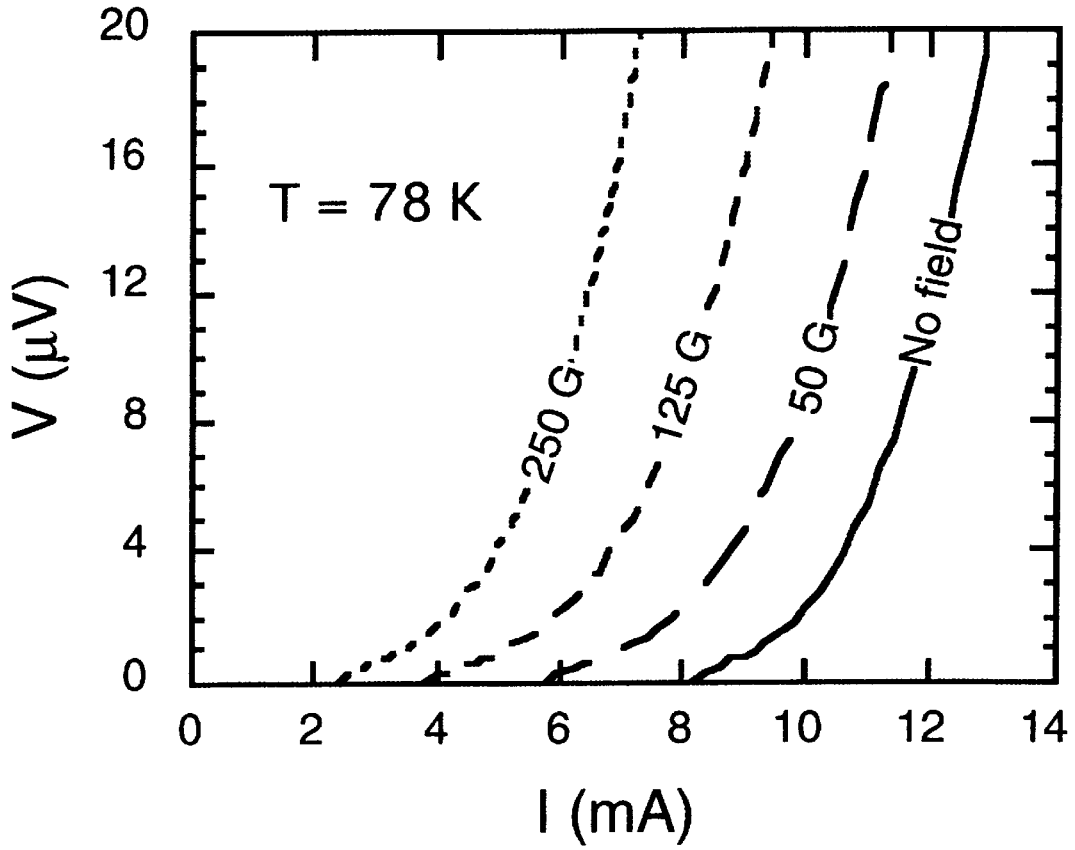
FIG. 5 is a plot of current, I (expressed in mA units), versus voltage (expressed in $\mu$V units) for an exemplary composite material with 840 Å thick Ag and 800 Å thick YBCO regions at a temperature of 78 Kelvin, the plots being made from data taken in the presence of an externally applied magnetic field of varying strengths (e.g. no external field applied, 50 Gauss external field applied, 125 Gauss external field applied, 250 Gauss external applied field). The substrate upon which the Ag and YBCO is deposited is MgO. Note that small, applied fields cause significant reductions in $J_c$ and an increase in sample voltage at a given current.

The electrical properties of these composite material films are strongly dependent on the substrate 10 used and the relative amounts of noble metal (n.b. amount of noble metal used is proportional to the thickness of the noble metal layer formed) and amounts of superconductor (n.b. amount of superconductor used is proportional to the thickness of the superconductor layer formed). For example, for some of the Ag composites, $T_c$ is essentially independent of Ag thickness below approximately 3500 Å and rapidly decreases with increasing amounts of silver. At 3750 Å of Ag, the superconducting transition is incomplete. $J_c$ is relatively constant for silver thicknesses below about 2500 Å and rapidly decreases with further-increase in Ag thickness. For example, for a composite material film with 800 Å of YBCO, the effect of Ag thickness on $J_c$ is illustrated in FIG. 4. $J_c$ was measured at a reduced temperature $t=T/T_c=0.46$. The value of $T_c$ for the various composite material films plotted in FIG. 4 is about 80 degrees Kelvin. The effects of an external magnetic field on J*c* of these composite material films is of considerable importance in device applications. The presence of the noble metal within the grain boundaries allows intergranular Josephson currents to be controlled by external magnetic fields. Exemplary high quality YBCO films require applied fields of 10's of Tesla to affect $J_c$'s, but practical device operation is limited to several Gauss. The reduction in critical current for applied magnetic fields of 0 Gauss, 50 Gauss, 125 Gauss and 250 Gauss, respectively, applied to an exemplary YBCO/Ag composite material film (e.g. 800 Å YBCO and 840 Å Ag) is shown in the I-V traces of FIG. 5. The external applied magnetic field was applied perpendicular to the composite material film sample which consisted of a bar of the composite material film approximately 2 mm wide and 1 mm long, held at a temperature of about 78 degrees Kelvin. The $J_c$ reduction by applied fields on the order of about 50 to about 250 Gauss indicate that these composite material films are useful for HTS devices that are based on "easily moved" magnetic vortices.

Figure 6:
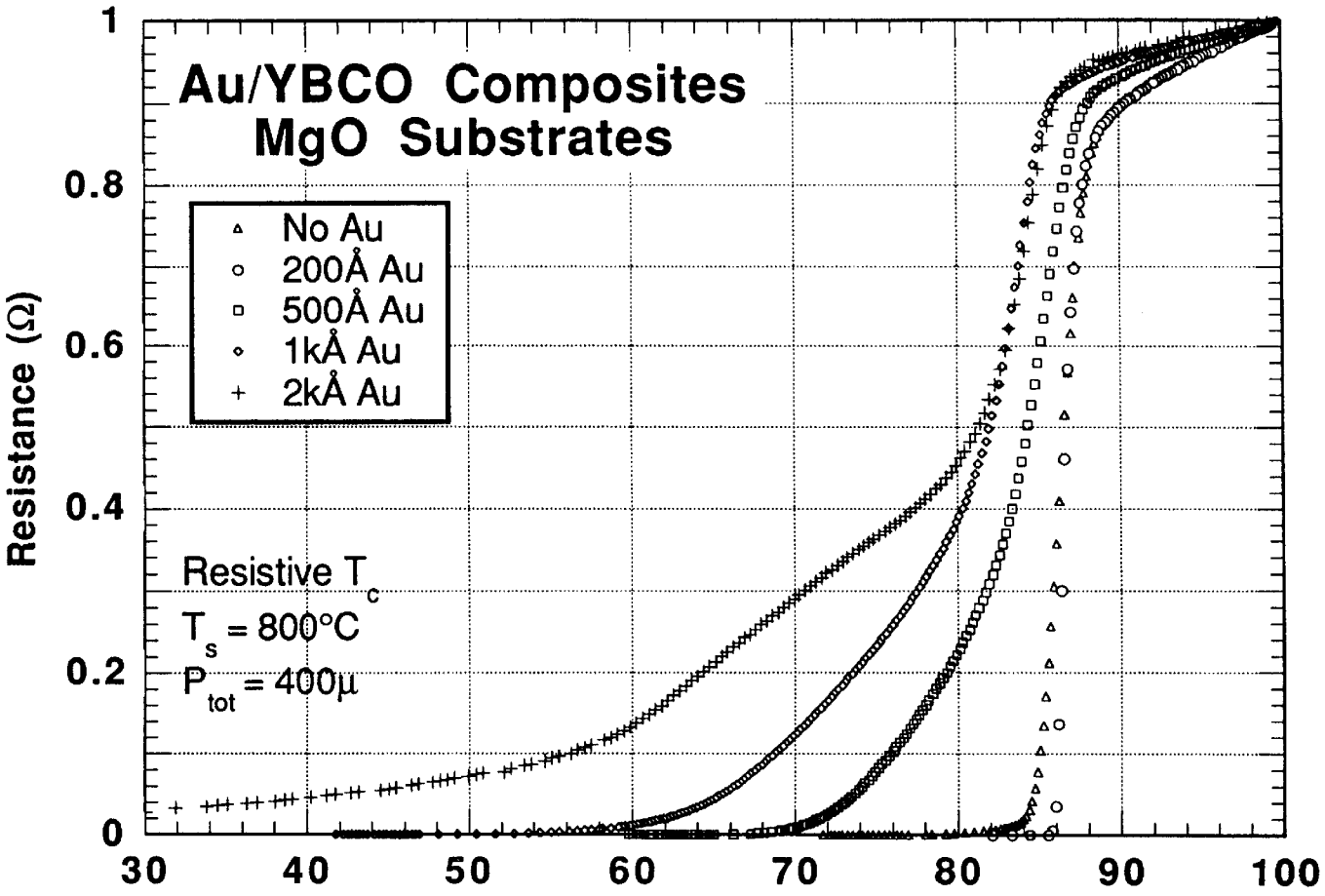
FIG. 6 is a plot of resistance, R (expressed in Ω units), versus temperature (expressed in degrees Kelvin) for each of several exemplary composite materials with exemplary Au being deposited at varying first thicknesses and YBCO deposited at a second thickness of about 2000 Å upon a MgO substrate. Note that while the superconducting onset temperature remains high, the $T_c$ is lowered with increasing thickness of Au.

The morphology and electrical characteristics of the exemplary YBCO/Au composite material films are similar to those of the exemplary Ag composite material films. For example, the morphology of an exemplary YBCO/Au composite material film wherein 200 Å of Au and 2000 Å of YBCO are deposited at 800° C. by ICM sputtering on an exemplary MgO substrate is similar to the morphology depicted in FIGS. 1 and 2. FIG. 6 illustrates the T, dependence on Au thickness for the exemplary YBCO/Au composite material films deposited on exemplary MgO substrates. Similar results were obtained for exemplary substrates such as STO and LAO, but with less gold required to completely suppress T. The J*c* was observed to systematically decrease with increasing Au thickness. Note that in FIG. 6, $T_s$=800° C., wherein $T_s$ is the YBCO deposition temperature (i.e. deposition of YBCO on the substrate). $T_c$ is the critical temperature of the composite material film wherein measurement of $T_c$was made by direct electrical contact to the sample. $P_{tot}$=400 $\mu$m of total pressure of the argon/oxygen gas mixture used (e.g. 50 parts argon and 50 parts oxygen) during YBCO deposition. See L.H. Allen et al., Thin film composites of Au and $YBa_2Cu_3O_{7-\delta}$, Appl. Phys. Lett., vol. 66(8), pp. 1003–1005 (Feb. 20, 1995), incorporated herein by reference in its entirety and for all purposes. See E.J. Cukauskas et al., Role of hydrogen in the growth of $Y_1Ba_2Cu_3O_7$-δ, on MgO substrates by off-axis magnetron sputtering, Appl. Phys. Lett., vol. 61(3), pp. 1125–1127 (Aug. 31, 1992), incorporated herein by reference in its entirety and for all purposes. See L.H. Allen et al., Thin Film Composites of Au and $YBa_2Cu_3O_{7-\delta}$, IEEE Transactions on Applied Superconductivity (to be published in 1995— incorporated herein), incorporated herein by reference in its entirety and for all purposes. See M.A-Fisher et al., Thin Film Y-Ba-Cu-O/Ag Composites for Fluxonic Devices, IEEE Transactions on Applied Superconductivity (to be published 1995—incorporated herein), incorporated herein by reference in its entirety and for all purposes. Note that the T, is measured for exemplary YBCO/Au composite material films wherein the thickness of the Au puddles is 0 Å, 200 Å, 500 Å, 1000 Å, and 2000 Å, respectively, for the five plots of resistance versus temperature depicted in FIG. 6.

Figure 7:
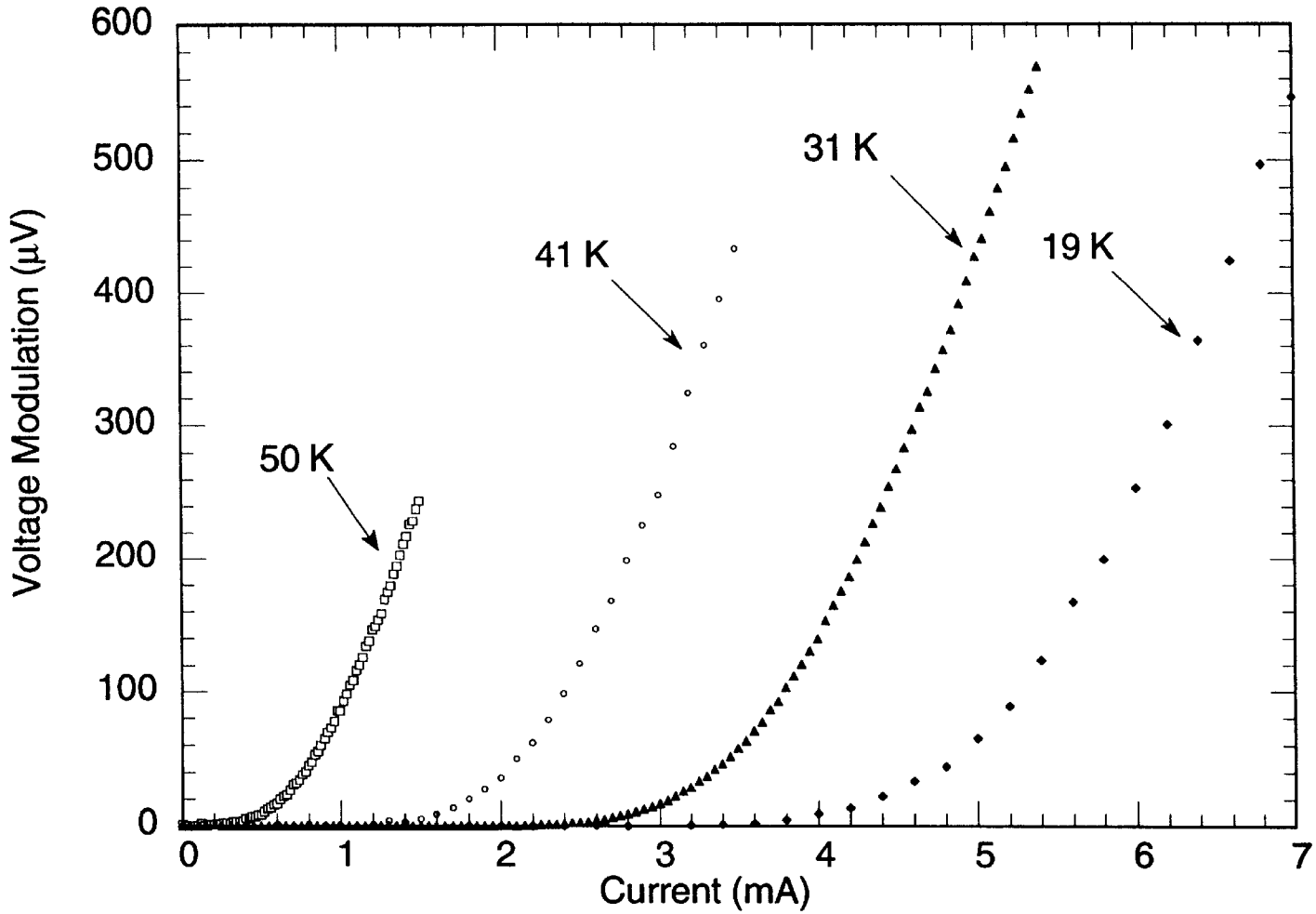
FIG. 7 is a plot of voltage change (expressed in $\mu$V units) versus current (expressed in mA units) for the Au/YBCO composite of FIG. 6 wherein the voltage variation is measured due to a 3 Gauss applied external magnetic field at selected temperatures (expressed in degrees Kelvin).

FIG. 7 illustrates the change in voltage as a function of current due to an external applied magnetic field of 3 Gauss for an exemplary YBCO/Au composite material film at selected temperatures of 19 degrees Kelvin, 31 degrees Kelvin, 41 degrees Kelvin and 50 degrees Kelvin, respectively. The differential voltage plotted in FIG. 7 represents the I-V curve modulation due to an external control magnetic field. The magnitude of this voltage per unit change of magnetic field is a measure of the potential usefulness of the composite material film in the fabrication of three terminal and non-linear superconducting devices. The voltage modulation must be sufficiently above the background noise level for use in such devices. Of equal importance is the vortex velocity. Its origin must not be thermal in nature but related to electronic forces or redistribution of circulating currents such as is the case for Josephson vortices. The superconductor/noble metal composites such as YBCO/Au and YBCO/Ag have characteristics useful in photodetector applications. There is a correlation between photoresponse and resistivity near $T_c$. Initially, there is a large drop in resistance as the exemplary YBCO grains of the exemplary YBCO/Au composites (see FIGS. 6 and 8) become superconducting and the photoresponse is predominantly bolometric in this resistive transition region. At lower temperatures (FIG. 6), a resistive foot or tail appears as the intergranular coupling becomes stronger with decreasing temperature. In this foot or tail of the resistivity, the photoresponse is due to bolometric and non-bolometric components. Finally, the resistance vanishes at the superconducting transition temperature and a zero resistance critical current develops with further reduction of temperature. These three regions correspond to distinctively different photoresponse characteristics of the composite material films.

Figure 8:
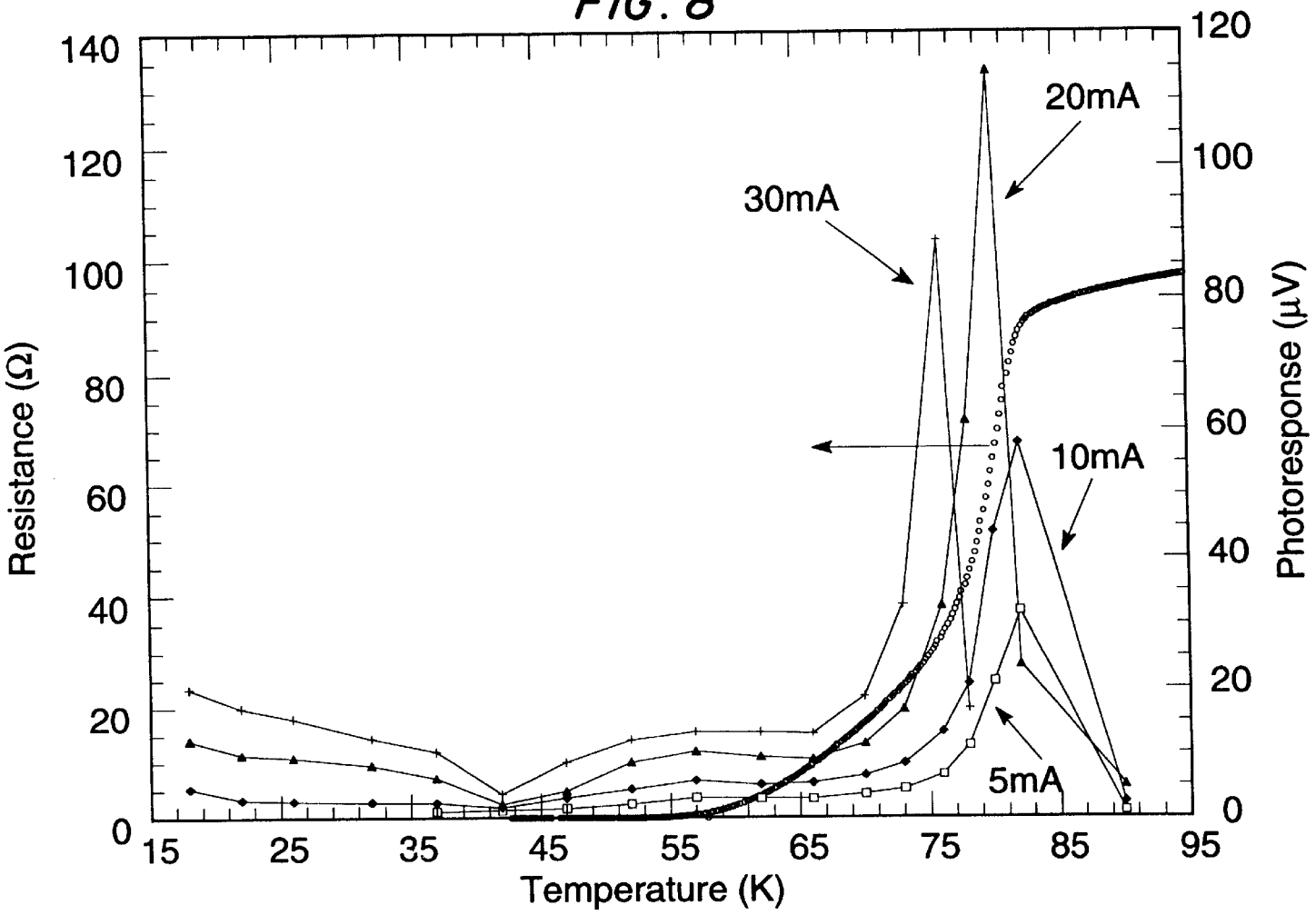
FIG. 8 contains two plots: (1) of temperature (expressed in degrees Kelvin) versus resistance (expressed in Ω units) and (2) of temperature (expressed in degrees Kelvin) versus photoresponse (expressed in $\mu$V units) of a Au/YBCO thin film bridge wherein the bias current is as indicated (the bias current being expressed in InA units) and wherein the composite thin film comprised of about 2000 Å thickness of YBCO and about 500 Å thickness of Au. The results were obtained using a He-Ne 2mW laser as the light source.

The photoresponse of an exemplary YBCO/Au composite material film under several temperature and bias conditions was measured to demonstrate the responsiveness of these composite materials for photodetector applications. Operation in the superconducting region is non-thermal and may be used for high speed operation. These results are illustrated in FIG. 8 along with the resistance versus temperature characteristics of a 1 mm wide bridge by 1 mm long exemplary YBCO/Au composite material film. The film consisted of 500 Å of gold and 2000 Å of YBCO. The results were obtained using a He-Ne 2mW laser as the light source.

The novel composite material films have the essential properties required by several superconducting devices. The incorporation of a noble metal along the superconductor grain boundaries during deposition of the superconductor forms SNS junctions between the superconducting grains. By controlling the relative amounts (i.e. thickness) of the noble metal and superconductor, the intergranular coupling is controlled. The thickness control results in weak vortex pinning and greater vortex mobility with the application of an external magnetic field but without sacrificing high operating temperatures for devices. Additionally, the novel composite material films have high quality superconducting grains and clean interfaces at the boundary between the noble metal and superconductor as indicated by the high T, of these materials (i.e. the $T_c$ of the pure superconductor is not significantly decreased after formation of the superconductor/noble metal composite material film). These novel composite material films (i.e. of superconductor/noble metal) are ready, as deposited, for the fabrication of superconducting, three terminal, flux flow devices, as well as photodetectors and non linear, two terminal devices. See A.M. Kadin, Duality of fluxonics in superconducting devices, J. Appl. Phys., vol. 68(11), pp. 5741–5749 (Dec. 1, 1990), incorporated herein by reference in its entirety and for all purposes. See J.S. Martens et al., Flux Flow Microelectronics, IEEE Trans. Appl. Superconductivity, vol. 3, No. 1, pp. 2295–2302 (1993), incorporated herein by reference in its entirety and for all purposes. See Y.H. Kao et al., Effects of silver doping in the high-T, superconductor system Y-Ba-Cu-O, J. Appl. Phys., vol. 67(1), pp. 353–361 (Jan. 1, 1990), incorporated herein by reference in its entirety and- for all purposes. See F. Raissi et al., Josephson flaxonic diode, Appl. Phys. Lett., vol. 65(4), pp. 1–3 (Oct. 3, 1994), incorporated herein by reference in its entirety and for all purposes.

Having described the invention, the following examples are given to illustrate specific applications of the invention, including the best mode now known to perform the invention. These specific examples are not intended to limit the scope of the invention described in this application.

EXAMPLES

Substrates such as MgO which are hygroscopic in nature, the substrates (e.g. MgO) are stored in mineral oil. Prior to the use of an exemplary MgO substrate, the substrate must be cleaned to remove mineral oil and any particulate matter present upon the substrate. For removing the mineral oil and removing particulate matter the substrate may be cleaned according to the following procedure (I):

(1) clean substrate for 5 minutes in a trichloroethane (TCA) ultrasonic bath;

(2) then clean substrate again for another 5 minutes in a fresh TCA ultrasonic bath;

(3) then clean substrate for 5 minutes in a fresh methanol ultrasonic bath;

(4) then clean substrate for 30 minutes in a fresh methanol ultrasonic bath;

(5) then blow dry the substrate under nitrogen gas;

(6) then heat the substrate to about 1000° C. in pure oxygen for 12 hours at 1 atmosphere pressure of oxygen;

(7) then allow substrate to cool to ambient (e.g. room temperature) temperature.

For substrates that are not hygroscopic or not stored in mineral oil, the substrates may be cleaned according to the following procedure (II):

(1) clean substrate in boiling methanol for 2 minutes;

(2) then clean substrate in boiling isopropyl alcohol for 2 minutes;

(3) then blow dry the substrate in nitrogen gas.

Procedure (I) was used to clean MgO substrates and procedure (II) was used to clean STO substrates. In procedure (I), TCE (trichloroethylene) may be used instead of TCA; however, TCE is believed to be more toxic than TCA. Thus, use of TCA in procedure (I) is preferred.

EXAMPLE 1

We prepared sample OA-449 by first cleaning an MgO substrate. We attached the substrate onto a substrate holder (a stainless steel disk of 3 inches in diameter and ¼ inch in thickness) by the use of an exemplary silver paste (e.g. "Silver Paste Plus" from SPI Supplies, Inc., West Chester, Pennsylvania) between the substrate and the substrate holder and loaded the sample into our off-axis sputter system. We then sputtered (using conventional on-axis geometry) a 2000 Å thick Ag layer at ambient temperature. We heated the Ag sample to the optimal off-axis sputtering growth temperature for YBCO (670° C.) and annealed at 670° C. for 90 minutes, and the Ag film coalesced into islands. We then deposited an 850 Å thick film of YBCO onto the sample by off-axis sputtering. The YBCO was deposited in a chamber containing a $P_{tot}$=250 $\mu$m total pressure of argon gas, oxygen gas and hydrogen gas (i.e. 62 parts argon, 38 parts oxygen and 12 parts hydrogen). The sample was cooled and removed from the vacuum chamber.

EXAMPLE 2

We prepared sample OA-465 exactly as sample OA-449, except we used a 30 minute anneal and deposited 2132 Å of YBCO.

EXAMPLE 3

We prepared sample OA-493 exactly as sample OA-449 except 3250 Å of Ag was deposited and 800 Å of YBCO was deposited.

EXAMPLE 4

We prepared sample ICM-161C by cleaning an MgO substrate. We thermally evaporated a 500 Å thick layer of Au at ambient temperature in a separate evaporator vacuum chamber. We then attached the substrate to a substrate holder (using silver paste—"Silver Paste Plus" from SPI, Inc., West Chester, Pennsylvania) and loaded the sample into our inverted cylindrical magnetron (ICM) sputtering system. The Au sample was heated to the optimal growth temperature for ICM sputtering, 800° C., and annealed for 15 minutes at 800° C. We then deposited a 2000 Å thick layer of YBCO by ICM sputtering. The sample was cooled and removed from the chamber.

We claim:

1. A composite material film, said composite material comprising:

(a) a substrate layer having puddles of noble metal deposited thereon, wherein said puddles of said noble metal layer define a discontinuous film of noble metal puddles in physical contact with said substrate layer, said discontinuous film having a first average thickness; and (b) a superconductor layer comprising superconducting grains and having a second thickness of about 500 Å to about 5000 Å deposited on said substrate layer between said paddles such that:

(1) said puddles form islands of noble metal that are in physical contact with said substrate layer and protrude from said substrate through an upper surface of said superconductor layer; and (2) said noble metal also accumulates between said superconducting grains to form a two-dimensional array of superconductor-normal metal-superconductor Josephson junctions.

2. The composite of claim 1 wherein said substrate is selected from the group consisting of MgO, STO, LAO, and YSZ.

3. The composite of claim 1 wherein said substrate is any substrate which is suitable for deposition of said noble metal layer and deposition of said superconductor layer.

4. The composite of claim 1, wherein said noble metal is selected from the group consisting of Ag, Au, or mixtures thereof.

5. The composite of claim 4 wherein said noble metal is Ag and said superconductor is YBCO.

6. The composite of claim 4, wherein said first average thickness is between about 200 to 4500 Å.

7. The composite of claim 4, wherein said first average thickness is between about 800 to 2000 Å.

8. The composite of claim 4 wherein said noble metal is Au and said superconductor is YBCO.

9. The composite of claim 4, wherein said first average thickness is between about 1/10th of said second thickness about 1 times said second thickness.

10. The composite of claim 4, wherein said first average thickness is between about 200 to 2000 Å.

11. The composite of claim 4, wherein said first average thickness is between about 400 to 600 Å.

12. The composite of claim 1 wherein said superconductor is selected from the group consisting of YBCO, BSCCO, and thallium based superconductor.

13. The composite of claim 1 wherein said superconductor is a yttrium based superconductor.

14. The composite of claim 1 wherein said superconductor is a bismuth based superconductor.

15. A composite material film made by a process comprising the steps of:

(a) providing a substrate;

(b) forming a noble metal layer having a first thickness upon said substrate; and (c) depositing a superconductor layer including superconducting grains and having a second thickness of about 500 Å to about 5000 Å, at a temperature wherein said metal layer forms puddles exposing regions of substrate and said superconductor deposits between said puddles on said exposed regions of said substrate such that:

(1) said puddles form islands of noble metal that are in physical contact with said substrate and protrude from said substrate through an upper surface of said superconductor layer; and (2) said noble metal also accumulates between said superconducting grains to form a two-dimensional array of superconductor-normal metal-superconductor Josephson junctions.

16. A composite material film made by a process comprising the steps of:

(a) providing a substrate;

(b) forming a noble metal layer having a first thickness upon said substrate;

(c) heating said noble metal layer to a sufficient temperature to form puddles of noble metal exposing underlying regions of substrate; and (d) depositing a superconductor layer having a second thickness, and comprising superconducting grains, on said exposed regions of said substrate such that:

(1) said puddles form islands of noble metal that are in physical contact with said substrate and protrude from said substrate through said superconductor layer; and (2) said noble metal also accumulates between said superconducting grains to form a two-dimensional array of superconductor-normal metal-superconductor Josephson junctions.

* * * * *